No. 883,146. PATENTED MAR. 24, 1908.
P. W. NOBLE.
BEARING FOR SUPPORTING RADIATORS IN AUTOMOBILE FRAMES.
APPLICATION FILED NOV. 23, 1907.
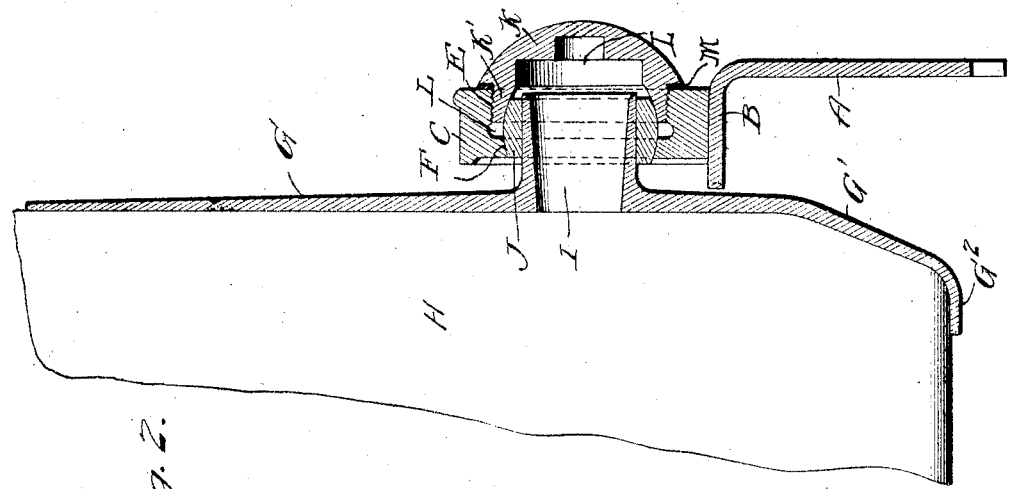
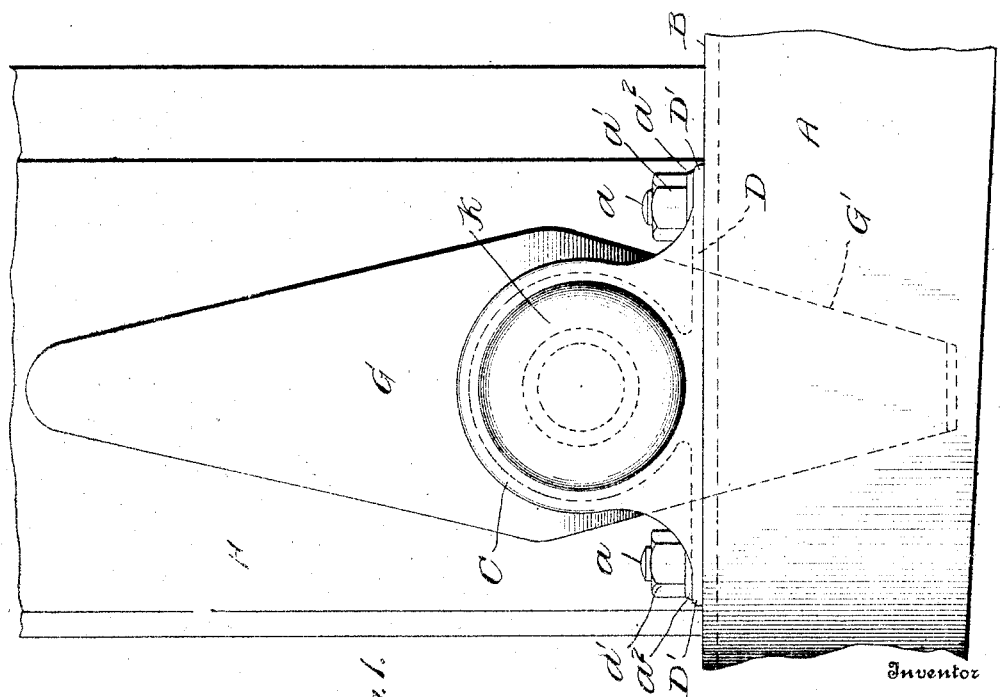

UNITED STATES PATENT OFFICE.

PERCY WARREN NOBLE, OF NEW YORK, N. Y., ASSIGNOR TO CHARLES A. SINGER, OF LARCH-MONT, NEW YORK, AND HENRY U. PALMER, OF BROOKLYN, NEW YORK.

BEARING FOR SUPPORTING RADIATORS IN AUTOMOBILE-FRAMES.

No. 883,146.  Specification of Letters Patent.  Patented March 24, 1908.

Application filed November 23, 1907. Serial No. 493,493.

*To all whom it may concern:*

Be it known that I, PERCY WARREN NOBLE, a citizen of Great Britain and Ireland, and a resident of the borough of Manhattan, in the city, county, and State of New York, have invented certain new and useful Improvements in Bearings for Supporting-Radiators in Automobile-Frames, of which the following is a specification.

This invention relates to bearings for supporting radiators in automobile frames, and has specially in view an improved form of trunnion bearing by which the radiator is supported, and which is adapted to relieve the radiator of undue strains through the distortion of the automobile frame.

With the above and many other objects in view, the invention contemplates providing an automobile frame with one member of a universal bearing, and a radiator supporting -saddle trunnion with the other member of a universal bearing, mounted thereon so as to be longitudinally movable on the trunnion shaft.

The structure involved in the present invention is susceptible to various modifications, but a preferred embodiment of the same is shown in the accompanying drawings, wherein—

Figure 1 is a side elevation of a portion of the frame of an automobile showing the present invention applied thereto. Fig. 2 is a sectional view thereof.

In the drawings, wherein like characters of reference designate corresponding parts, A indicates the front end portion of one of the sides of an automobile frame, the upper flange B of which forms a support for the upstanding circular bearing box C. The bearing box C has preferably cast integrally therewith a flat base D, the ends D'—D', of which are each provided with openings which register with similar openings in the supporting flange B for the reception of fastening bolts $d$, $d$, said bolts being retained in their fastening position by means of the nuts $d'$, $d'$, which bear upon washers $d^2$ $d^2$ mounted on said bolts and resting on the ends of the base.

The interior of the bearing box is provided with a threaded portion E and a bearing seat F which are spaced apart and formed at opposite ends of said bearing box, the bearing seat being projected beyond the plane of the edges of the threads, and having its bearing surface slightly concaved and in a taper, the function of which will be presently explained.

The radiator supporting saddle G is preferably, but not necessarily, of an elongated diamond shape, the lower portion G' of which is slightly inclined and terminates in an inturned end which forms a base flange G² for the radiator H. The intermediate portion of the supporting saddle is provided with a laterally extending trunnion I which carries a longitudinal movable bearing ring J, the bearing surface of which is spherical in form.

A retaining bearing cone K which is of a larger diameter than the opening in the bearing box C, carries a projecting circular neck portion K', the periphery of which is of substantially the same diameter as said opening, and is threaded complemental to the threaded interior portion E of said bearing box. The inner surface of the said projecting circular portion K' is slightly concaved and tapered so as to coincide with the concavity of the interior bearing surface F, whereby when the bearing cone is in the position shown in Fig. 2 of the drawings, a circular concaved bearing will be formed within the bearing box. A soft washer of leather or other similar material M, may be placed around the neck K' of the bearing cone K, so as to make the bearing dust proof and yet permit of an adjustment of the cone K to take up any wear in the bearing.

By reference to Fig. 2 of the drawings it will be observed that the bearing surface of the retaining cone K does not extend far enough within the bearing box C to abut against the bearing seat F of said box, a space being left there between which, in conjunction with a recess L formed in the box provides for an unobstructed circulation of a lubricant to all movable parts of the bearing, and for storing a considerable quantity of lubricant in the bearing box.

To assist in supporting the radiator in the proper upright position, the connections between the bottom and top of the radiator and the usual rigid water pipes communicating with the cylinders and pump, are in the form of flexible hose which it has not been considered necessary to show in the drawings.

From the foregoing description it will be understood that a distortion of the frame will not produce any undue strains upon the radiator, as the trunnion I is free to move longitudinally through the bearing ring J, and the bearing ring J is free to rotate in any direction in its bearing box.

Having described my invention, what I claim as new and desire to secure by Letters Patent, is:

1. In combination, an automobile frame carrying a bearing box provided with a bearing seat, a radiator supporting saddle carrying a trunnion provided with a bearing surface, and a retaining bearing cone adapted to engage with said bearing box and the said surface of the trunnion.

2. In combination, an automobile frame carrying a bearing box provided with a circular concaved bearing seat, a radiator supporting saddle carrying a trunnion provided with a convexed bearing surface, and a retaining bearing cone adapted to engage with said bearing box and having a concaved bearing surface.

3. In combination, an automobile frame carrying a bearing box provided with a circular bearing seat, a radiator supporting saddle provided with a bearing trunnion, and a retaining bearing cone adapted to engage with said bearing box and being provided with a bearing surface coöperating with the said bearing seat.

4. A universal bearing support for radiators consisting of an upright bearing box carrying one member of a bearing surface, a retaining cone adapted to engage with said bearing box and provided with a surface forming the other member of the bearing surface, and a radiator supporting saddle provided with a trunnion having a bearing ring which engages with the bearing surfaces of said bearing box and said retaining cone.

5. The combination with an automobile frame and a radiator, of a radiator supporting saddle having longitudinally movable universal trunnion bearing connections with the frame.

6. The combination with an automobile frame and a radiator, of a radiator supporting saddle, having longitudinally movable, universal trunnion bearing connections with the frame, and flexible connections between the upper and lower parts of the radiator and the engine.

Signed at New York city, in the county and State of New York, this 20th day of November A. D. 1907.

P. WARREN NOBLE.

Witnesses:
R. STANLEY BOLGER,
BENEDICT A. DREVES.